(12) United States Patent
Kim

(10) Patent No.: US 6,535,927 B1
(45) Date of Patent: Mar. 18, 2003

(54) SYSTEM FOR PROCESSING PROTOCOL FOR INTERNET SERVICES EMPLOYING SERIAL LINE AND ATM NETWORK

(75) Inventor: Hoon-Jae Kim, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/317,437

(22) Filed: May 24, 1999

(30) Foreign Application Priority Data

May 23, 1998 (KR) ............................................ 98-18713

(51) Int. Cl.[7] ............................................. G06F 15/16
(52) U.S. Cl. ..................... 709/249; 709/250; 709/231; 709/236
(58) Field of Search ................................. 709/227, 230, 709/231, 236, 249, 250; 725/109, 110, 117, 131; 370/389, 392, 395, 401, 402, 465, 466, 352

(56) References Cited

U.S. PATENT DOCUMENTS

| | | | |
|---|---|---|---|
| 5,392,277 A | 2/1995 | Bernstein | |
| 5,583,927 A | 12/1996 | Ely et al. | |
| 5,666,487 A | * 9/1997 | Goodman et al. | 709/246 |
| 5,715,250 A | * 2/1998 | Watanabe | 370/401 |
| 5,737,333 A | * 4/1998 | Civanlar et al. | 370/352 |
| 5,802,287 A | 9/1998 | Rostoker et al. | |
| 5,818,842 A | * 10/1998 | Burwell et al. | 370/465 |
| 5,870,565 A | 2/1999 | Glitho | |
| 5,991,292 A | * 11/1999 | Focsaneanu et al. | 370/352 |
| 6,081,533 A | * 6/2000 | Laubach et al. | 370/466 |
| 6,108,350 A | * 8/2000 | Ajaujo et al. | 370/465 |
| 6,310,862 B1 | * 10/2001 | Roy | 370/401 |
| 6,339,594 B1 | * 1/2002 | Civanlar et al. | 370/352 |
| 6,351,771 B1 | * 2/2002 | Craddock et al. | 709/227 |

FOREIGN PATENT DOCUMENTS

WO    WO 97/28622    8/1997

OTHER PUBLICATIONS

Laubach, M.; Request for Comments (RFC) 1577, "Classical IP and ARP over ATM"; Jan. 1994.*
Cole et al.; Request for Comments (RFC) 1932, "IP over ATM: A Framework Document"; Apr. 1996.*
Thomas Hou, Yiwei; "Overview of implmenting ATM based enterprise local area network for desktop multimedia publishing"; IEEE Communications Magazine; ISBN 0163–6804, pp. 70–76; Apr. 1996.*
Kalyanaraman, S.; "Performance of TCP/IP over ABR service on ATM networks"; Global Telecommunications Conference, 1996; ISBN 0–7803–3336–5, pp. 468–475 v.1; Nov. 1996.*
Zahariadis, T.; "Adaption of Internet access on a broadband DAVIC architecture"; Second IEEE Symposium on Computers and Communications; ISBN 0–8186–7852–6, pp 507–511; Jul. 1997.*
Request for Comments (RFC) 2225; "Classical IP and ARP over ATM" by M. Laubach & J. Halpern, Apr. 1998, pp. 1–28.
Chinese Patent Office Action in corresponding co–pending Ser. No. 99106796.7 dated Apr. 29, 2002.
Xue–Ping Lu, Key Techniques for Interactive Television, Set–Top Box, Video Server and User Interface in Television Technology vol. 3, Mar. 31, 1998, pp. 25–36.

* cited by examiner

Primary Examiner—Mark Powell
Assistant Examiner—Marc D. Thompson
(74) Attorney, Agent, or Firm—Robert E. Bushnell, Esq.

(57) ABSTRACT

A system for processing protocols for Internet services employing a serial line and an asynchronous transfer mode (ATM) network, including a settop-box for loading transmission control protocol/Internet protocol (TCP/IP) data on a designated ATM cell or delivering TCP/IP data loaded on an ATM cell to a computer, and an Internet gateway for converting the data according to a protocol used in an external network into the TCP/IP data transferred through the settop-box and the ATM network, wherein the Internet gateway also converts the TCP/IP data into the data according to the protocol used in the external network.

26 Claims, 3 Drawing Sheets

SYSTEM FOR PROCESSING PROTOCOL FOR INTERNET SERVICES EMPLOYING SERIAL LINE AND ATM NETWORK

CLAIM OF PRIORITY

This application makes reference to, incorporates the same herein, and claims all benefits accruing under 35 U.S.C. §119 from an application entitled SYSTEM FOR PROCESSING PROTOCOL FOR INTERNET SERVICES EMPLOYING SERIAL LINE AND ATM NETWORK earlier filed in the Korean Industrial Property Office on May 23, 1998, and there duly assigned Serial No. 18713/1998, a copy of which is annexed hereto.

BACKGROUND OF THE INVENTION

1. Technical Field

The present invention relates to a system for processing protocols for Internet services employing a serial line and an asynchronous transfer mode (ATM) network.

2. Related Art

Internet services are available which can be utilized to exchange information between users of computer systems. An asynchronous transfer mode (ATM) network can be used to facilitate such exchanges of information. The transmission control protocol/Internet protocol (TCP/IP) is an Internet protocol by which the Internet services are provided through an ATM network. I have found that there is a need to improve protocol processing for Internet services to improve communication functions and to facilitate an exchange of information.

Background information regarding asynchronous transfer mode (ATM) is as follows. In the field of high speed networking, asynchronous transfer mode (ATM) is a key component. ATM is a telecommunications technique for carriage of a complete range of user traffic, including voice, data, and video signals, on any user-to-network interface (UNI). The ATM telecommunications technique was defined by the American National Standards Institute (ANSI) and International Telecommunications Union (ITU) standards.

Internet services are available which can be utilized to exchange information between users of computer systems. An asynchronous transfer mode (ATM) network can be used to facilitate such exchanges of information. The transmission control protocol/Internet protocol (TCP/IP) is an Internet protocol by which the Internet services are provided through an ATM network. I have found that there is a need to improve protocol processing for Internet services to improve communication functions and to facilitate an exchange of information.

Inefficient protocol processing can slow the communication across networks such as Internet service-related networks, which can be extremely inconvenient. Efforts have been made to improve network communications.

Exemplars of recent efforts in the art include U.S. Pat. No. 5,870,565 for TELECOMMUNICATIONS MANAGEMENT NETWORK CONNECTED TO A COMMON CHANNEL SIGNALING NETWORK issued to Glitho, U.S. Pat. No. 5,802,287 for SINGLE CHIP UNIVERSAL PROTOCOL MULTI-FUNCTION ATM NETWORK INTERFACE issued to Rostoker, et al., U.S. Pat. No. 5,666,487 for NETWORK PROVIDING SIGNALS OF DIFFERENT FORMATS TO A USER BY MULTPLEXING COMPRESSED BROAD BAND DATA WITH DATA OF A DIFFERENT FORMAT INTO MPEG ENCODED DATA STREAM issued to Goodman, U.S. Pat. No. 5,583,927 for METHOD AND APPARATUS FOR INTEGRATING TELEPHONE AND BROADBAND NETWORKS issued to Ely, et al., and U.S. Pat. No. 5,392,277 for ROUTING TO INTELLIGENCE issued to Bernstein.

While these recent efforts provide advantages, I note that they fail to adequately provide a method and system for efficiently and conveniently processing protocols for Internet services employing a serial line and an ATM network.

SUMMARY OF THE INVENTION

It is an object of the present invention to provide a system for processing protocols for Internet services employing a serial line and an ATM network where a settop-box needs not perform the protocol conversion.

It is another object of the present invention to provide a system for processing protocols for Internet services regardless of the kinds of the protocols used in an ATM network.

According to the present invention, a system for processing protocols for Internet services employing a serial line and ATM network comprises: a settop-box loading TCP/IP data on a designated ATM cell or delivering TCP/IP data loaded on an ATM cell to a computer, and an Internet gateway converting the data according to a protocol used in an external network into the TCP/IP data transferred through the settop-box and ATM network, wherein the Internet gateway also converts the TCP/IP data into the data according to the protocol used in the external network.

To achieve these and other objects in accordance with the principles of the present invention, as embodied and broadly described, the present invention provides an apparatus conveying data between two locations, said apparatus comprising: a computer unit conveying varying information to a user; a serial communication cable being coupled to said computer unit; a settop box unit being coupled to said serial communication cable, said settop box unit receiving said first data output via said serial communication cable from said computer unit, loading said first data on at least one primary asynchronous transfer mode cell, outputting said first data loaded on said at least one primary asynchronous transfer mode cell, receiving second data, outputting said second data via said serial communication cable to said computer unit, said first and second data conforming to a first communications protocol, said first data being different from said second data; an asynchronous transfer mode network receiving said first data output from said settop box unit and then outputting said first data, receiving said second data and then outputting said second data to said settop box unit; an Internet gateway unit receiving said first data from said asynchronous transfer mode network, converting said first data from said first communications protocol to a second communications protocol, receiving said second data conforming to said second communications protocol, converting said second data from said second communications protocol to said first communications protocol, loading said second data conforming to said first communications protocol on at least one secondary asynchronous transfer mode cell, outputting said second data loaded on said at least one secondary asynchronous transfer mode cell to said asynchronous transfer mode network; and an external network being coupled to said Internet gateway, receiving said first data conforming to said second communications protocol from said Internet gateway unit, outputting said second data conforming to said second communications protocol to said Internet gateway unit, said second communications protocol being compatible with said external network.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

The Internet services are widely provided for persons to exchange information with one another by means of computer systems almost without restriction of time and space. To this end, there may be used an ATM network such as digital cable television (CATV) or video-on-demand (VOD) network. The transmission control protocol/Internet protocol (TCP/IP) is an Internet protocol by which the Internet services are provided through an ATM network.

Figure 1:
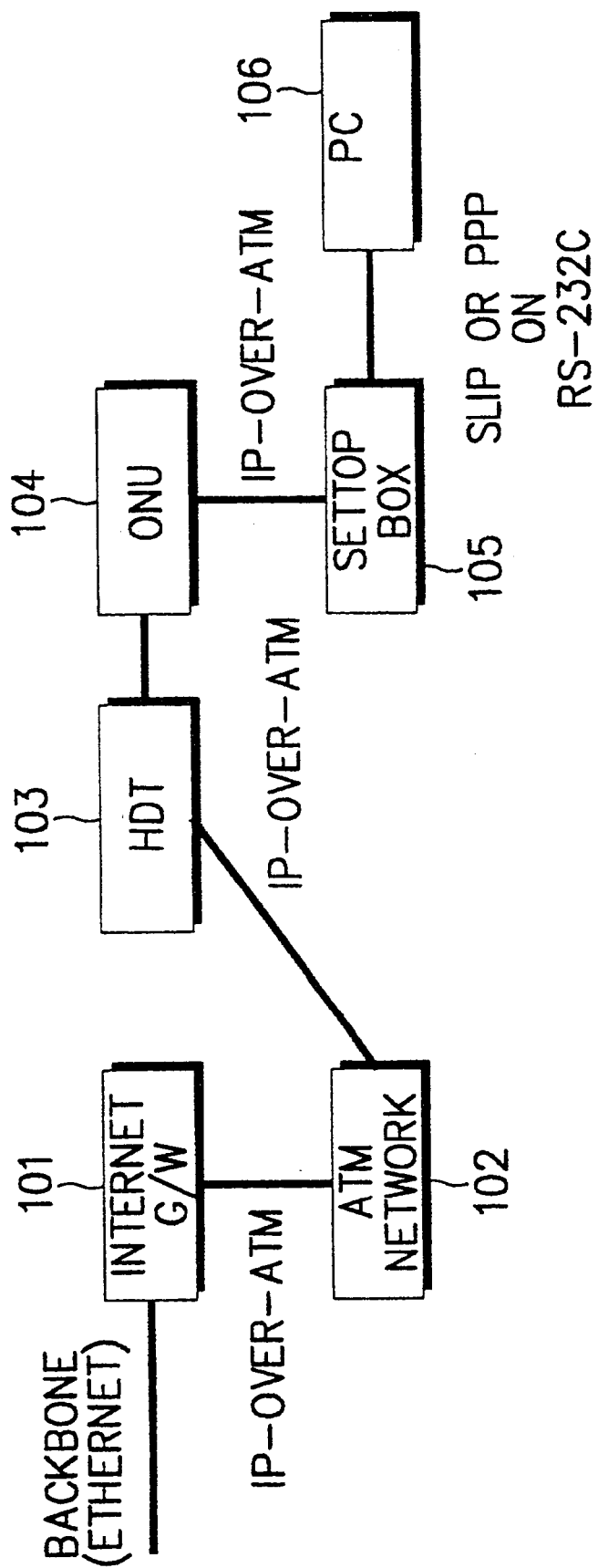
FIG. 1 is a block diagram illustrating a system for processing protocols for Internet services employing a serial line and an ATM network.

Turn now to FIG. 1, which shows a block diagram illustrating a system for processing such protocols for Internet services employing a serial line and ATM network. Referring FIG. 1, a computer system 106 is connected through RS-232C serial port with a settop-box 105 to perform data communication according to transmission control protocol/Internet protocol (TCP/IP).

A settop box can correspond to a device able to perform various functions. For example, a settop box can support Internet access through a television, and can provide users with high-speed access to the Internet via a cable modem or broadband network rather than the traditional telephone network plain old telephone services (POTS). In addition, a settop box can provide video-conferencing capabilities, can support community networking, and can provide media-on-demand (MOD) capabilities including video-on-demand, music-on-demand, news-on-demand, impulse-pay-per-view, and television-programs-on-demand. A settop box is often located at a remote user location enabling the user to transmit information signals such as requests, instructions, or other data. A settop box can include a central processing unit.

Referring to FIG. 1, the TCP/IP communication software includes point to point protocol (PPP) and serial line Internet protocol (SLIP) to make data communication through a modem. PPP is the subprotocol of TCP/IP used in connection by a wide area network, and SLIP for the ATM Internet protocol connection. The settop-box 105 is in turn connected with an Internet gateway unit 101 through an ATM network 102, host digital terminal (HDT) 103, and optical network unit (ONU) 104. An optical network unit can correspond to an optical-to-electrical node. Each optical-to-electrical node performs optical to electrical conversion on signals.

The components are connected by means of optical cables, through which the communication is accomplished according to Internet protocol-over-ATM (IP-over-ATM) of the Internet specification RFC 2225. The Internet specification RFC 2225 entitled "Classical IP and ARP over ATM" was developed in April 1998 by M. Laubach of Com21, Inc., and J. Halpern of Newbridge Networks, Inc., in conjunction with the Network Working Group of the Internet Engineering Task Force. The Internet specification RFC 2225 dated April 1998 obsoletes RFC 1577 dated January 1994.

The settop-box 105 requires a data conversion module for converting data between SLIP protocol and IP-over-ATM protocol to accomplish the Internet service. Unix equipment or a router may be used for the Internet gateway unit 101. However, such a conversion module for converting data between SLIP protocol and IP-over-ATM protocol needs much of the resources of the CPU, adversely affecting the overall performance of the settop-box. Further, the settop-box may not be effectually used in an ATM network not supporting the IP-over-ATM.

Figure 2:
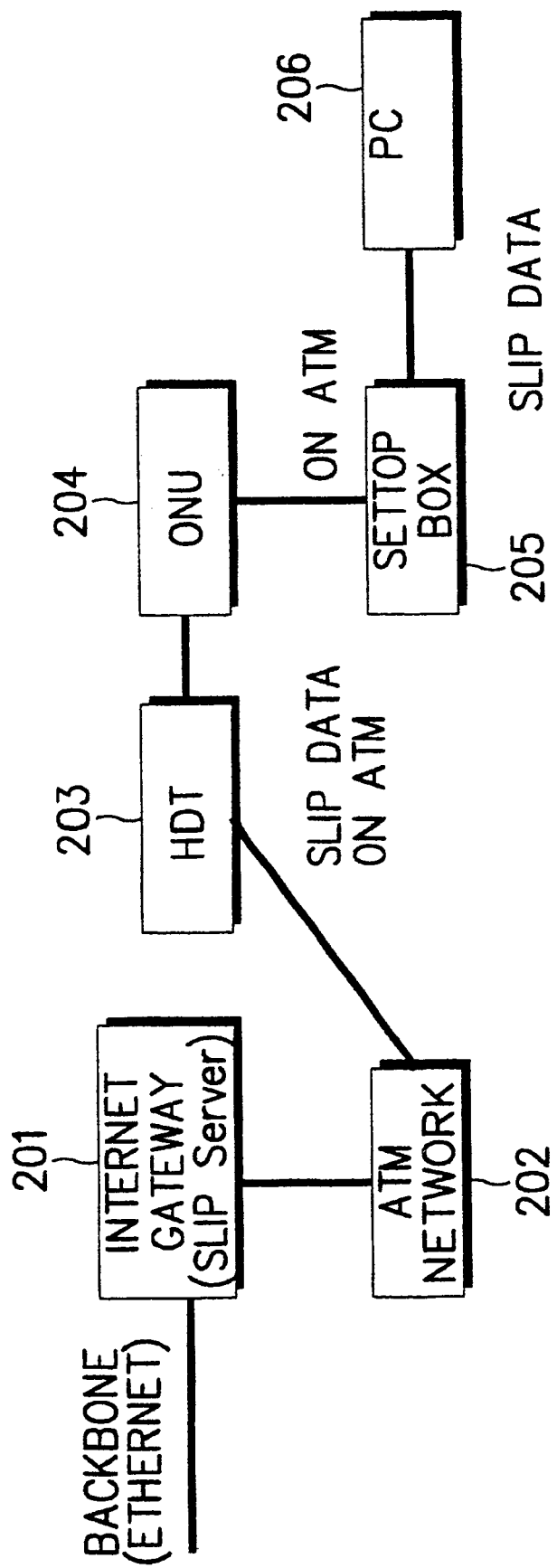
FIG. 2 is a block diagram illustrating an Internet gateway and settop-box, in accordance with the principles of the present invention.

Turn now to FIG. 2, which is a block diagram illustrating an Internet gateway and settop-box, in accordance with the principles of the present invention. Referring to FIG. 2, there is shown a system for processing protocols for Internet services employing a serial line and an ATM network, which is connected with a digital cable television network. A personal computer (PC) 206 is connected through an RS-232C serial port to a settop-box 205 to exchange SLIP data. It is also connected with an Internet gateway unit 201 through an ATM network 202, HDT 203, and optical network unit (ONU) 204 to exchange SLIP data. These are all connected by means of optical cables. The Internet gateway unit 201 converts SLIP data into TCP/IP data. The Internet gateway unit 201 also converts TCP/IP data into SLIP data. The personal computer (PC) 206 can be replaced by a desktop computer, a portable computer such as a notebook computer or laptop computer, a palm-sized computer, or other type of computer.

Figure 3:
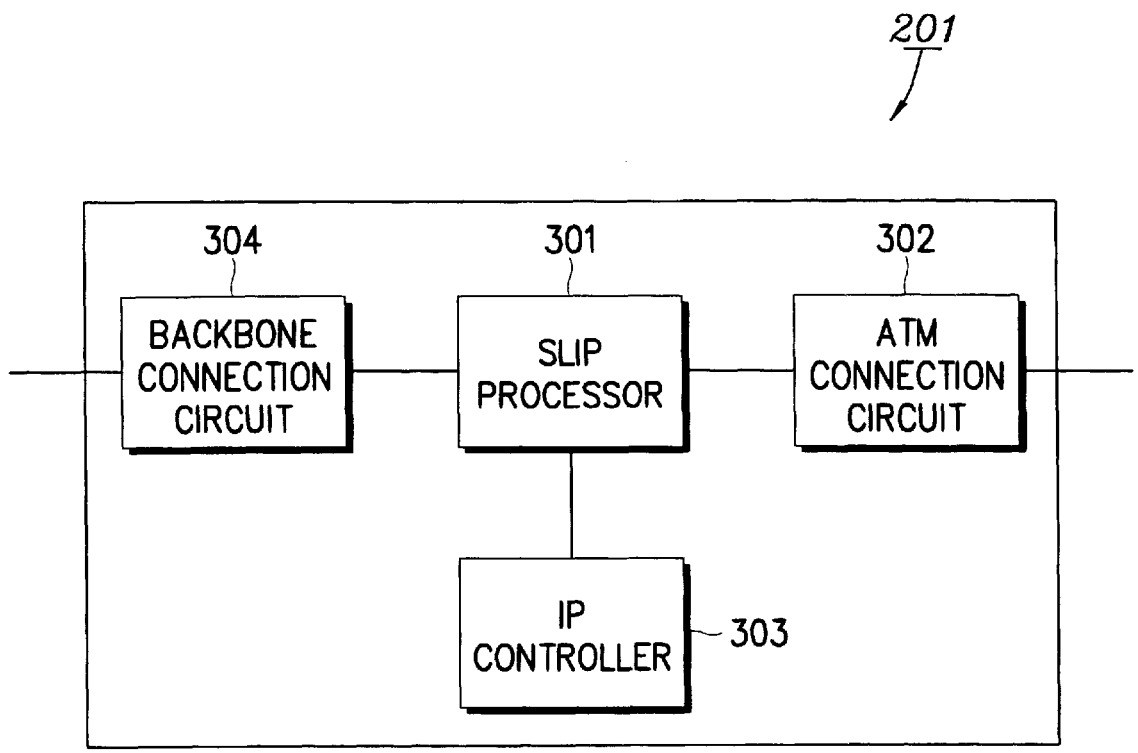
FIG. 3 is a block diagram illustrating the structure of the Internet gateway shown in FIG. 2, in accordance with the principles of the present invention.

Turn now to FIG. 3, which shows a block diagram illustrating the structure of the Internet gateway shown in FIG. 2, in accordance with the principles of the present invention. Referring to FIG. 3, the Internet gateway unit 201 includes a backbone connection circuit 304, SLIP processor 301, ATM connection circuit 302, and IP controller 303. The SLIP processor 301 converts TCP/IP data into SLIP data. The SLIP processor 301 also converts SLIP data into TCP/IP data. The backbone connection circuit 304 is connected with a backbone network such as Ethernet, a fiber distributed data interface (FDDI), an ATM network, or other backbone network. The backbone connection circuit 304 exchanges TCP/IP data with the SLIP processor. The IP controller 303 controls all the Internet protocols of the computers externally connected through the Internet gateway 201, providing information as requested by the SLIP processor 301. The ATM connection circuit 302 loads the SLIP data of the SLIP processor 301 on an ATM cell channel, delivering it to the settop-box 205. It also delivers the SLIP data loaded on an ATM cell from the settop-box 205 to the SLIP processor 301.

Referring to FIGS. 2 and 3, a first example of operation is as follows: First, data is transmitted from personal computer 206 to settop box 205. Second, the settop box 205 loads SLIP data, corresponding to the data received from personal computer 206, onto a designated ATM cell. Third, the SLIP data which is loaded on an ATM cell is conveyed from the settop box 205 to the ONU 204 to the HDT 203 to the ATM network 202 and then to the Internet gateway 201. Fourth, the SLIP processor 301 receives the SLIP data and converts the SLIP data into corresponding TCP/IP data. Then the TCP/IP data is delivered to the backbone connection circuit 304 and corresponding data is then outputted from the Internet gateway 201 to the backbone. The backbone connection circuit 304 converts the TCP/IP data received from SLIP processor 301 into a communications protocol appropriate for the backbone.

With continued reference to FIGS. 2 and 3, a second example of operation is as follows: First, data is received by the Internet gateway 201 from the backbone, and the backbone connection circuit 304 converts the data to TCP/IP data. Second, the SLIP processor 301 receives TCP/IP data from the backbone connection circuit 304. Third, the SLIP processor 301 converts the TCP/IP data to corresponding SLIP data and then outputs the SLIP data to the ATM connection circuit 302. Fourth, the SLIP data is loaded onto a designated ATM cell and then transferred to the ATM network 202 to the HDT 203 to the ONU 204 and then to the settop box 205. Fifth, the settop box 205 separates the SLIP data from the ATM cell and then delivers corresponding data through the serial port to the personal computer 206.

Also, in operation according to the principles of the present invention, personal computer 206 calls serial line Internet protocol (SLIP) or point-to-point protocol (PPP) to transfer transmission control protocol/Internet protocol (TCP/IP) data through the serial port to the settop-box 205, which in turn loads the SLIP or PPP data on a designated ATM cell, transferring it through ONU 204, HDT 203, and ATM network 202 to the Internet gateway unit 201. In the Internet gateway unit 201, the SLIP processor 301 interprets and converts the SLIP or PPP data received from the ATM connection circuit 302 into the corresponding TCP/IP data delivered to the backbone connection circuit 304.

In accordance with the principles of the present invention, the data inputted from the external backbone network to personal computer 206 is converted into TCP/IP data delivered to the SLIP processor 301, which in turn converts the TCP/IP data into the corresponding SLIP data delivered to the ATM connection circuit 302. The SLIP data is loaded on a designated ATM cell, transferred through ONU 204, HDT 203, and ATM network 202 to the settop-box 205, which in turn delivers the SLIP data through the serial port to personal computer 206. Finally, personal computer 206 interprets the SLIP data into the corresponding TCP/IP data.

Thus, the inventive system provides the following advantages: First, the Internet protocol addresses of the computers are controlled by the Internet gateway, centralizing the control of the network. Second, the settop-box may accomplish the essential function of audio/video decoding more effectively at high speed because it no longer performs the data conversion function according to the Internet protocols. Third, the inventive Internet gateway provides versatility to connect with various external networks, actively contributing to development of the networks.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus conveying data between two locations, said apparatus comprising:

a computer unit;

a serial communication cable;

a settop box unit being coupled to said serial communication cable, said settop box unit receiving first data conforming to a first communications protocol and output via said serial communication cable from said computer unit, loading said first data conforming to said first communications protocol on at least one primary asynchronous transfer mode cell, outputting said first data conforming to said first communications protocol and loaded on said at least one primary asynchronous transfer mode cell, receiving second data conforming to said first communications protocol and loaded on at least one secondary asynchronous transfer mode cell, separating said second data from said at least one secondary asynchronous transfer mode cell, outputting said separated second data conforming to said first communications protocol via said serial communication cable to said computer unit, said first data being different from said second data;

an Internet gateway unit receiving said first data conforming to said first communications protocol and loaded on said at least one primary asynchronous transfer mode cell and outputted from said settop box unit, separating said first data from said at least one primary asynchronous transfer mode cell, converting said separated first data from said first communications protocol to a second communications protocol, outputting said first data conforming to said second communications protocol and not loaded on asynchronous transfer mode cells, receiving said second data conforming to said second communications protocol, converting said second data from said second communications protocol to said first communications protocol, loading said second data conforming to said first communications protocol on at least one secondary asynchronous transfer mode cell, outputting said second data loaded on said at least one secondary asynchronous transfer mode cell to said settop box unit; and an external network being coupled to said Internet gateway unit, receiving said first data conforming to said second communications protocol from said Internet gateway unit, outputting said second data conforming to said second communications protocol to said Internet gateway unit, said second communications protocol being compatible with said external network.

2. The apparatus of claim 1, wherein said first communications protocol is a protocol selected from the group consisting of transmission control protocol/Internet protocol, point-to-point protocol, and serial line Internet protocol.

3. The apparatus of claim 1, wherein said second communications protocol corresponds to an Ethernet protocol and said external network corresponds to an Ethernet network.

4. The apparatus of claim 1, wherein said external network corresponds to an asynchronous transfer mode network.

5. The apparatus of claim 1, wherein said second communications protocol corresponds to transmission control protocol/Internet protocol.

6. The apparatus of claim 1, said Internet gateway unit further comprising:

a connection circuit receiving said first data conforming to said first communications protocol from said settop box unit, separating said first data from said at least one primary asynchronous transfer mode cell, outputting said separated first data conforming to said first communications protocol, receiving said second data conforming to said first communications protocol not loaded on said at least one secondary asynchronous transfer mode cell, loading said second data conforming to said first communications protocol on said at least one secondary asynchronous transfer mode cell, outputting said second data conforming to said first communications protocol and loaded on said at least one secondary asynchronous transfer mode cell to said settop box unit; and a protocol processor receiving said separated first data conforming to said first communications protocol from said connection circuit, converting said first data from said first communications protocol to said second communications protocol, outputting said first data conforming to said second communications protocol to said external network, receiving said second data conforming to said second communications protocol from said external network, converting said second data from said second communications protocol to said first communications protocol, outputting said second data conforming to said first communications protocol to said connection circuit.

7. The apparatus of claim 6, said first communications protocol corresponding to serial line Internet protocol.

8. The apparatus of claim 1, said first communications protocol corresponding to serial line Internet protocol, said second communications protocol corresponding to transmission control protocol/Internet protocol.

9. The apparatus of claim 1, said Internet gateway unit converting said first data received from said settop box unit from said first communications protocol to an intermediate communications protocol and then converting said first data from said intermediate communications protocol to said second communications protocol.

10. The apparatus of claim 9, said Internet gateway unit converting said second data received from said external network from said second communications protocol to said intermediate communications protocol and then converting said second data from said intermediate communications protocol to said first communications protocol.

11. The apparatus of claim 10, said Internet gateway unit further comprising:

a backbone connection circuit receiving said second data conforming to said second communications protocol from said external network, converting said second data from said second communications protocol to said intermediate communications protocol, outputting said second data conforming to said intermediate communications protocol, receiving said first data conforming to said intermediate communications protocol, converting said first data from said intermediate communications protocol to said second communications protocol, outputting said first data conforming to said second communications protocol to said external network;

an asynchronous transfer mode connection circuit receiving said first data conforming to said first protocol from said settop box unit, separating said first data from said at least one primary asynchronous transfer mode cell, loading said second data conforming to said first communications protocol on said at least one secondary asynchronous transfer mode cell; and a protocol processor receiving said first data from said asynchronous transfer mode connection circuit, converting said first data from said first communications protocol to said intermediate communications protocol, outputting said first data conforming to said intermediate communications protocol, receiving said second data from said backbone connection circuit, converting said second data from said intermediate communications protocol to said first communications protocol, outputting said second data conforming to said first communications protocol.

12. The apparatus of claim 11, said Internet gateway unit further comprising a protocol controller being coupled to said protocol processor, controlling protocols of computers externally connected through said Internet gateway unit, and providing information as requested by said protocol processor.

13. The apparatus of claim 12, said first communications protocol corresponding to serial line Internet protocol, said intermediate communications protocol corresponding to transmission control protocol/Internet protocol, said second communications protocol corresponding to a communications protocol compatible with said external network.

14. A system utilizing a serial line and an asynchronous transfer mode network to convey data between a computer unit and an external network, said system comprising:

a serial communication cable conveying computer information in a serial manner to and from a computer unit;

a settop box unit receiving first data conforming to transmission control protocol/Internet protocol through said serial communication cable from the computer unit, loading first data conforming to transmission control protocol/Internet protocol on first designated asynchronous transfer mode cells, receiving second data conforming to said transmission control protocol/Internet protocol loaded on second designated asynchronous transfer mode cells, separating said second data conforming to said transmission control protocol/Internet protocol from said second designated asynchronous transfer mode cells, outputting said second data conforming to said transmission control protocol/Internet protocol via said serial communication cable to the computer unit, said first data being different from said second data; and an Internet gateway unit being coupled between said settop box unit and an external network, receiving from said settop box unit said first data conforming to said transmission control protocol/Internet protocol loaded on said first designated asynchronous transfer mode cells, separating said first data from said first designated asynchronous transfer mode cells, converting said separated first data to a predetermined protocol of the external network, receiving said second data conforming to the predetermined protocol of the external network from the external network, converting said second data to said transmission control protocol/Internet protocol, loading said second data conforming to said transmission control protocol/Internet protocol on said second designated asynchronous transfer mode cells, outputting to said settop box unit via said asynchronous transfer mode unit said second data conforming to said transmission control protocol/Internet protocol loaded on said second designated asynchronous transfer mode cells.

15. The apparatus of claim 14, said system processing protocols for Internet services, the external network providing Internet services.

16. The apparatus of claim 14, said Internet gateway unit further comprising:
- a backbone connection circuit being coupled with the external network, converting said first data from said transmission control protocol/Internet protocol to the predetermined protocol of the external network, converting said second data from the predetermined protocol of the external network to said transmission control protocol/Internet protocol;
- an asynchronous transfer mode connection circuit loading said second data on said second designated asynchronous transfer mode cells, separating said first data from said first designated asynchronous transfer mode cells;
- a transmission control protocol/Internet protocol data processor processing said second data received from said backbone connection circuit and said first data received from said asynchronous transfer mode connection circuit; and
- a protocol controller controlling protocols of computers externally connected through said Internet gateway unit, and providing information as requested by said transmission control protocol/Internet protocol data processor processor.

17. An apparatus conveying data between two locations, said apparatus comprising:
- a computer unit conveying varying information to a user;
- a serial communication cable conveying computer information to and from said computer unit in a serial manner;
- a settop box unit being coupled to said serial communication cable, receiving first data output via said serial communication cable from said computer unit, loading said first data on at least one primary asynchronous transfer mode cell, outputting said first data loaded on said at least one primary asynchronous transfer mode cell, receiving second data loaded on at least one secondary asynchronous transfer mode cell, separating said second data from said at least one secondary asynchronous transfer mode cell, outputting said separated second data via said serial communication cable to said computer unit, said first and second data conforming to a first communications protocol when said first and second data are received and outputted by said settop box unit, said first data being different from said second data;
- an asynchronous transfer mode network conveying said first data loaded on said at least one primary asynchronous transfer mode cell from said settop box unit, conveying said second data loaded on said at least one secondary asynchronous transfer mode cell to said settop box unit;
- an Internet gateway unit receiving said first data from said asynchronous transfer mode network, separating said first data from said at least one primary asynchronous transfer mode cell, converting said first data from said first communications protocol to a second communications protocol, receiving said second data conforming to said second communications protocol, converting said second data from said second communications protocol to said first communications protocol, loading said second data conforming to said first communications protocol on said at least one secondary asynchronous transfer mode cell, outputting said second data loaded on said at least one secondary asynchronous transfer mode cell to said asynchronous transfer mode network; and
- an external network being coupled to said Internet gateway unit, receiving said first data conforming to said second communications protocol from said Internet gateway unit, outputting said second data conforming to said second communications protocol to said Internet gateway unit, said second communications protocol being compatible with said external network.

18. The apparatus of claim 17, said Internet gateway unit converting said first data received from said asynchronous transfer mode network from said first communications protocol to an intermediate communications protocol and then converting said first data from said intermediate communications protocol to said second communications protocol.

19. The apparatus of claim 18, said Internet gateway unit converting said second data received from said external network from said second communications protocol to said intermediate communications protocol and then converting said second data from said intermediate communications protocol to said first communications protocol.

20. The apparatus of claim 19, said Internet gateway unit further comprising:
- a backbone connection circuit receiving said second data conforming to said second communications protocol from said external network, converting said second data from said second communications protocol to said intermediate communications protocol, outputting said second data conforming to said intermediate communications protocol, receiving said first data conforming to said intermediate communications protocol, converting said first data from said intermediate communications protocol to said second communications protocol, outputting said first data conforming to said second communications protocol to said external network;
- an asynchronous transfer mode connection circuit receiving said first data conforming to said first protocol from said asynchronous transfer mode network, separating said first data from said at least one primary asynchronous transfer mode cell, loading said second data conforming to said first communications protocol on said at least one secondary asynchronous transfer mode cell; and
- a protocol processor receiving said first data from said asynchronous transfer mode connection circuit, converting said first data from said first communications protocol to said intermediate communications protocol, outputting said first data conforming to said intermediate communications protocol, receiving said second data from said backbone connection circuit, converting said second data from said intermediate communications protocol to said first communications protocol, outputting said second data conforming to said first communications protocol.

21. The apparatus of claim 19, said Internet gateway unit further comprising a protocol controller being coupled to said protocol processor, controlling protocols of computers externally connected to said Internet gateway unit, and providing information as requested by said protocol processor.

22. An apparatus for data communications, the apparatus comprising:

a computer unit outputting first data conforming to serial line Internet protocol, receiving second data conforming to the serial line Internet protocol;

a settop box unit receiving from said computer unit the first data conforming to serial line Internet protocol, loading the first data conforming to serial line Internet protocol on at least one primary asynchronous transfer mode cell, outputting the first data conforming to serial line Internet protocol with the first data being loaded on the at least one primary asynchronous transfer mode cell, receiving the second data conforming to serial line Internet protocol with the second data being loaded on at least one secondary asynchronous transfer mode cell, separating the second data from the at least one secondary asynchronous transfer mode cell, outputting to said computer unit the separated second data conforming to serial line Internet protocol;

an optical network unit receiving from said settop box unit the first data conforming to serial line Internet protocol with the first data being loaded on the at least one primary asynchronous transfer mode cell, receiving the second data conforming to serial line Internet protocol with the second data being loaded on the at least one secondary asynchronous transfer mode cell, converting electrical signals to optical signals, converting optical signals to electrical signals;

an Internet gateway, comprising:

an ATM connection circuit receiving from said optical network unit the first data conforming to serial line Internet protocol with the first data being loaded on the at least one primary asynchronous transfer mode cell, separating the first data from the at least one primary asynchronous transfer mode cell, outputting the separated first data conforming to serial line Internet protocol with the first data being not loaded on any asynchronous transfer mode cells, receiving the second data conforming to serial line Internet protocol with the second data being not loaded on any asynchronous transfer mode cells, loading the second data conforming to serial line Internet protocol on the at least one secondary asynchronous transfer mode cell, outputting to said optical network unit the second data conforming to serial line Internet protocol with the second data being loaded on the at least one secondary asynchronous transfer mode cell;

a protocol processor receiving from said ATM connection circuit the first data conforming to serial line Internet protocol with the first data being not loaded on any asynchronous transfer mode cells, converting the received first data from serial line Internet protocol to a second communications protocol, outputting the first data conforming to the second communications protocol with the first data being not loaded on any asynchronous transfer mode cells, receiving the second data conforming to the second communications protocol with the second data being not loaded on any asynchronous transfer mode cells, converting the received second data from the second communications protocol to serial line Internet protocol, outputting the second data conforming to serial line Internet protocol with the second data being not loaded on any asynchronous transfer mode cells; and a backbone connection circuit receiving from said protocol processor the first data conforming to the second communications protocol with the first data being not loaded on any asynchronous transfer mode cells, receiving the second data conforming to the second communications protocol with the second data being not loaded on any asynchronous transfer mode cells; and an external network receiving from said backbone connection circuit the first data, outputting to said backbone connection circuit the second data.

23. The apparatus of claim 22, the second communications protocol corresponding to transmission control protocol/Internet protocol.

24. The apparatus of claim 22, said computer unit outputting first data conforming to serial line Internet protocol to said settop box unit through a serial cable directly connecting said computer unit to said settop box unit.

25. The apparatus of claim 24, the second communications protocol corresponding to transmission control protocol/Internet protocol.

26. The apparatus of claim 25, said backbone connection circuit converting the first data from the second communications protocol to a third communications protocol before outputting the first data to said external network when said external network is compatible with the third communications protocol and not the second communications protocol.

* * * * *